(No Model.)
E. N. DICKERSON, Jr.
AUTOMATIC ELECTRIC DAMPER REGULATOR.
No. 361,270. Patented Apr. 19, 1887.
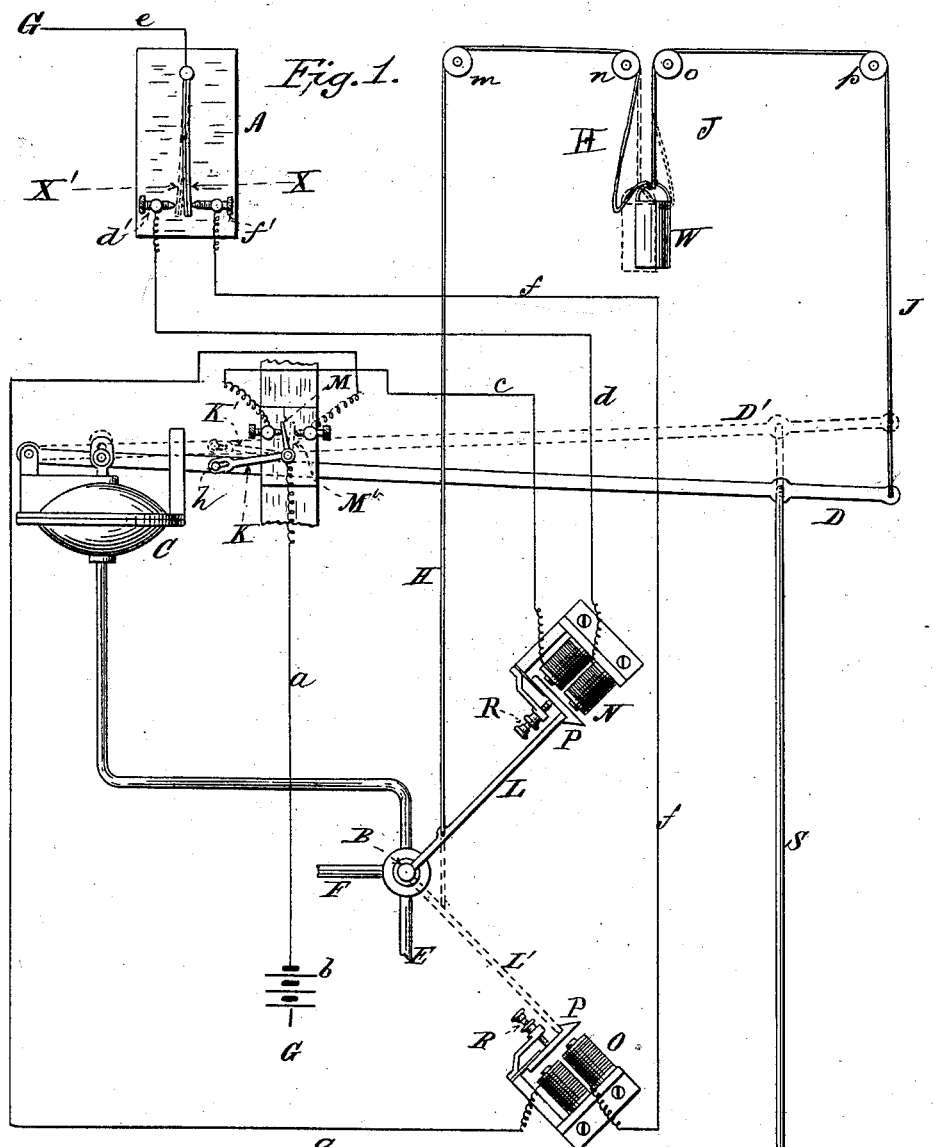
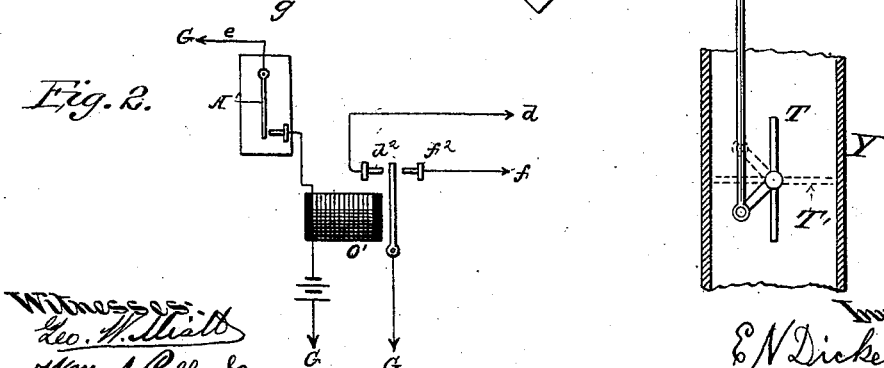

UNITED STATES PATENT OFFICE.

EDWARD N. DICKERSON, JR., OF NEW YORK, N. Y.

AUTOMATIC ELECTRIC DAMPER-REGULATOR.

SPECIFICATION forming part of Letters Patent No. 361,270, dated April 19, 1887.

Application filed February 27, 1885. Serial No. 157,217. (No model.)

*To all whom it may concern:*

Be it known that I, EDWARD N. DICKERSON, Jr., of the city, county, and State of New York, have invented a new and useful Improvement in Automatic Electric Regulators, of which the following is a full, true, and exact description, reference being had to the accompanying drawings, in which—

Figure 1 is a diagrammatic representation of one way of carrying out my invention, and Fig. 2 is a modification of detail.

The object of my invention is to arrange an electric regulator by means of which a damper or dampers may be automatically opened or closed; and my invention is particularly applicable to the regulation of temperature in living-rooms, and though I do not limit my invention to that function, yet I show it as applied to such purpose. Attempts have heretofore been made to open and close valves directly by the electric current, which attempts, so far as I know, have been failures. Attempts have likewise been made to apply auxiliary mechanism, like clock-work, to opening and closing valves, the said clock-work being itself controlled by electricity. By my invention I propose to use the pressure of water to accomplish the results desired.

In the drawings there is shown an apparatus for controlling the temperature in a room by opening and closing the valve which controls the hot air supplied to the same.

A represents a thermostat, which may be of any suitable structure, though I prefer one made of a combination of steel and hard rubber, which I have found by experience to be effective. This thermostat is so arranged as to make two electric contacts, for purposes hereinafter to be described. The thermostat A is of course placed in the room to be regulated. With this room communicates, likewise, the hot-air flue Y, provided with the valve T. This valve may be of any suitable structure—as, for instance, a register-valve may be employed.

C is a diaphragm such as is ordinarily connected with a "Clark" damper, and which raises the lever D, when pressure is applied beneath the diaphragm, in the well-known way. The lever D controls the valve T by means of the stem S. Water is admitted beneath the diaphragm C by the pipe E, while pipe F communicates with the waste.

B is a three-way valve, adapted to bring the diaphragm C in communication either with the water-pressure or the waste, as desired. As at present shown, the diaphragm connects with the waste-pipe F. This valve may be of any suitable construction, and for the diaphragm C may be substituted a piston-rod, cylinder, and piston, or other equivalent device, though I prefer the diaphragm shown. The valve B is controlled by the valve-lever L, which may be moved between the positions shown at L and L′ by the action of the apparatus, as will be presently described. When the lever L is in the position shown at L′, the diaphragm C will be in communication with the water-supply and the lever D will be raised. The lever L is made of sufficient weight to drop to the lower position at L′ when released by the magnet N. It is held at its upper and lower position by means of the hook P on the armature of the magnet, which armature is shaped like a latch, so that the lever may drop beneath the hook and be there retained. It is so held at either its upper or lower position. The position of the armature may be regulated by the set-screw R.

The upper magnet is lettered N and the lower one O, and they are alike in their general structure. It is advisable that the valve B and the magnets N and O be placed upon a single iron support, so that they may retain their positions with relation to each other. The lever L is controlled by the cord or chain H, which passes over the wheels *m n*. W is a weight, sufficiently heavy to raise the lever L and turn the valve when the circumstances arise for such action. I find a shot-cup very convenient for this purpose, as the weight may be regulated. Connected with the weight W is the cord or chain J, passing over the wheels *o p* and connecting at its other end with the lever D. The lever D likewise operates the electric switch K, which, as shown, is a bell-crank lever. The upper arm, M, of this lever makes contact with two set-screws, preferably adjustable, while the other arm is operated by the lever D through the intervention of the pin *h* and slotted hole. In the apparatus, as shown, when the lever D is depressed the arm M makes contact on the left, while, when it it is in the position shown at D', it makes contact on the right. The apparatus is operated by a battery, $b$, which may be either of the open or closed circuit variety; but I prefer an open-circuit battery. From this battery the circuit extends to the arm by means of wire $a$, and thence to wire $c$ or $g$. As shown, the battery connects with the wire $c$, thence through magnet N and wire $d$ to the screw $d'$ of the thermostat-arm. In the present condition this arm X is thrown to the right against the set-screw $f'$, and therefore the battery-circuit is cut at the set-screw $d'$. The thermostat-lever X communicates by wire $e$ to the ground at G. The wire $g$ connects with the magnet O and wire $f$ to the set-screw $f''$ of the thermostat $a$. In the position shown sufficient slack is left in the cord H to allow the lever L to drop into the position shown at L' if released from the magnet N. When the condition is reversed, sufficient slack will be left in the cord J to allow the weight W to throw the lever L' into the position shown at L.

The operation of my apparatus can now be readily understood. The thermostat, as shown at X, is on the cold side, and hot air is therefore poured into the room through the air-flue Y. When the temperature reaches the desired point, the thermostat-arm X will move to the position shown at X', thereby completing the battery-circuit. The instant this happens the electro-magnet N will operate, attracting this armature and releasing the lever L, which will drop to the position shown at L', thereby putting the water-pressure in connection with the diaphragm C. As soon as this happens, the diaphragm C will begin to raise the lever D. The first result of this movement will be to break the circuit between the arm M and the wire $c$. Thereby the battery is cut out of circuit. The arm L, in dropping from the position shown at L to the position shown at L', has taken up the slack in the cord H, and the weight W is therefore left suspended upon the cord H as the lever D moves upward, thereby releasing the tension of the cord J and allowing a slack in that cord, as shown in the dotted lines. When the lever D has moved to D', the valve T will assume the position shown at T', and the heat supplied to the room will be shut off; but the arm M will likewise have moved over, so as to make a contact with the wire $g$, connecting with the electro-magnet O. Therefore, when the thermostat passes from the hot side back to the cold side, as shown at X, it will cause the magnet O to operate, thereby attracting the arm P and allowing the weight W to throw the arm L' into its upper position, and the valve T' will assume the position shown at T. It is obvious, further, that were this change to occur while the lever D was at half-stroke, the arm L might be left in the middle, for, to insure the operation of the arm L, it is important that the lever D shall have completed its full stroke before the lever L is released from its locked position. This result is accomplished by the switch K, which prevents the release of the lever L until the arm D has substantially completed its stroke in both directions.

It is obvious that a spring could be substituted for the weight W, though I prefer the weight, and it is obvious that the movement of the lever L in both directions could be controlled by springs instead of by the weight of the arm L in one direction and the weight W in the opposite direction, though the force of gravity in this case is likewise much preferable. It is obvious, likewise, that the switch K, though important and valuable, is not essential. It is further obvious that many forms of latches could be devised besides that shown, though I consider the one shown the simplest and best known to me. Any apparatus which would retain the lever in its opposite positions until released by electro-magnetism would be the equivalent of my latch. By this apparatus the battery is only put in circuit long enough to do its work, when it is cut out until again called upon, which result is accomplished by the non-essential switch K. It is obvious, likewise, that a relay-magnet making two contacts may be substituted for the two-contact thermostat A, the connections being substantially as shown and that magnet being closed by a one-contact thermostat, so that when the thermostat makes its contact the controlling-magnet will make a contact to the ground through the wire $d$, while, when the thermostat is open, the controlling-magnet will make a contact through the wire $f$ to the ground, as shown in Fig. 2. In this case of course a small additional battery is, by preference, employed to operate the controlling-magnet.

It will be seen that by my invention I use the motion of the apparatus moving the air-valve to throw the water-valve, which itself controls the air-valve. Instead of an air-valve, T, any other suitable valve may be opened and closed, and instead of water the pressure of steam or air may be employed in the diaphragm, and, in cases where steam heat is employed and a constant pressure of steam maintained, it is in some cases advisable to substitute steam for water, though in most cases, the pressure of water being more constant than steam, I prefer to use water-pressure.

I am aware that attempts have before now been made to operate valves by clock-work, and I do not, therefore, broadly claim that idea.

It is of course apparent that various parts of my device may be used in connection with devices other than those shown.

What I claim as my invention, and desire to secure by Letters Patent, is—

1. The combination of an electrically-controlled valve and a fluid-pressure device for moving said valve, with a valve which controls the movement of said fluid-pressure device and mechanism whereby the force operating the first valve likewise causes the movement of the second valve, substantially as described.

2. The combination of the diaphragm C, three-way cock B, and a pressure-supply whereby the diaphragm is alternately raised and lowered, substantially as described.

3. The combination of the diaphragm C, three-way valve B, lever L, magnets N and O, and circuit connections, substantially as described.

4. The combination of the diaphragm C, lever D, and switch K, substantially as described.

5. The combination of the diaphragm C, lever D, switch K, lever L, magnets N and O, and connections between the switch and magnets, substantially as described.

6. The combination of the diaphragm C, lever D, switch K, lever L, magnets N and O, thermostat A, and circuit-connections, substantially as described.

7. The combination of the diaphragm C, valve B, valve T, and lever D, and connections between the valves and lever, whereby the valves T and B are both operated by the movement of the lever D, substantially as described.

8. The combination of the valve B, lever L, magnets N and O, cord H, weight W, and means for raising or lowering said weight, substantially as described.

9. The combination of the diaphragm C, valve B, lever L, lever D, cords H and J, and weight W, substantially as described.

10. The combination of the diaphragm C, lever D, switch K, valve B, magnets N and O, weight W, cords J and H, thermostat A, and the connections shown, whereby the valve B may be operated, substantially as described.

11. The combination of a diaphragm moved by the pressure of a fluid, a valve controlling a fluid-passage operated by the lever of said diaphragm, and a second electrically-controlled valve in the fluid-pressure supply connecting with said diaphragm, and mechanism for operating said fluid-pressure-supply valve, substantially as described.

12. The combination of a diaphragm connected to a fluid-pressure supply, a valve for controlling the movement of a fluid, mechanism whereby said diaphragm operates said valve, an electrically-controlled valve for controlling said diaphragm, two magnets for controlling said diaphragm-operating valve, a thermostat and battery, and connections between said thermostat and said magnets, one from either side of said thermostat, and an electric switch which, as soon as the thermostat has operated either magnet, serves to cut off the circuit through that magnet until the thermostat shall have moved to its opposite contact-point, substantially as described.

13. The combination of a valve-controlling diaphragm, a fluid-pressure supply connecting with said diaphragm, and an electrically-controlled three-way cock in said connection between the pressure-supply and the diaphragm, substantially as described.

E. N. DICKERSON, Jr.

Witnesses:
GEO. H. EVANS,
WM. A. POLLOCK.